INVENTORS
THOMAS P. BLUITT et al

BY Darby & Darby

ATTORNEYS

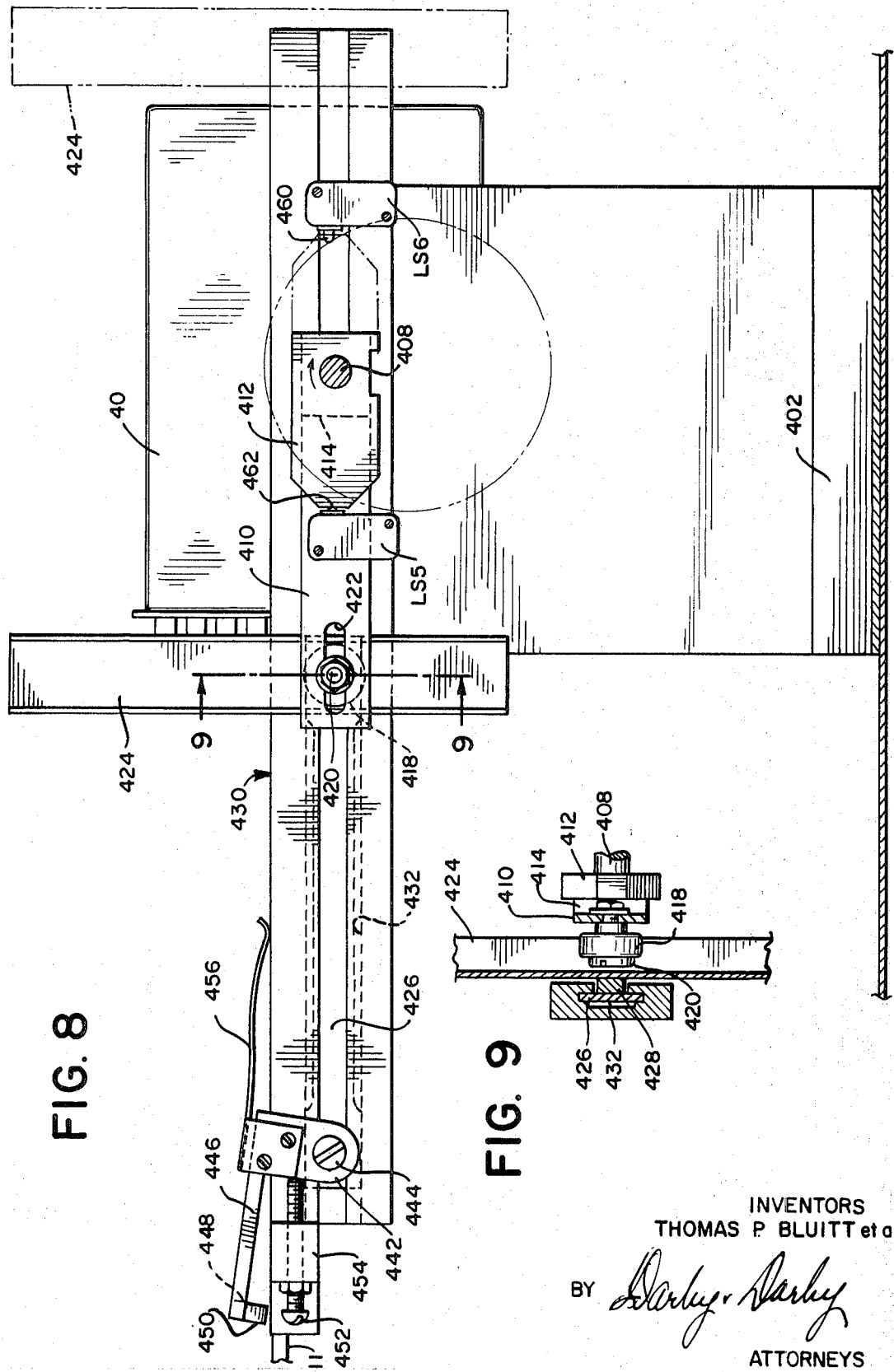

Sept. 15, 1970 T. P. BLUITT ET AL 3,528,735
MICROIMAGE VIEWER INCLUDING AUTOMATIC MATRIX SELECTION
Filed May 1, 1968 8 Sheets-Sheet 7

INVENTORS
THOMAS P. BLUITT et al
BY Darby & Darby
ATTORNEYS

United States Patent Office 3,528,735
Patented Sept. 15, 1970

3,528,735
MICROIMAGE VIEWER INCLUDING AUTOMATIC MATRIX SELECTION
Thomas P. Bluitt, Blue Point, Christian A. Alfsen, East Northport, and Arvi Koivu, Roosevelt, N.Y., assignors, by mesne assignments, to Microform Data Systems, Inc., a corporation of Delaware
Filed May 1, 1968, Ser. No. 725,845
Int. Cl. G03b 23/08
U.S. Cl. 353—27                                10 Claims

ABSTRACT OF THE DISCLOSURE

A microimage viewer for use with a matrix of microimages comprises a cartridge adapted to hold a plurality of said matrices in a vertically stacked relationship, an elevator assembly for vertically moving said cartridge so as to position a preselected matrix for movement between a viewing table and cartridge, and a selector assembly for moving a preselected matrix between the cartridge and table. When it is desired to replace a first matrix on a table with a selected matrix, the selector assembly moves the first matrix from the table into its proper storage position within the cartridge. The elevator assembly then causes the cartridge to move vertically so as to position the selected matrix adjacent the table, at which point the selector assembly is actuated to move the selected matrix from the cartridge on to the table. A special switch assembly, a portion of which is movable with the cartridge, is used in combination with a matrix selector switch, which is manually settable, so as to control the automatic selection process.

---

This invention relates to microimage viewers and, in particular, to microimage viewers wherein the images are arrayed in a matrix such that random access is provided to any selected image.

In its preferred embodiment, the present invention relates to apparatus intended specifically to increase the capacity of the microimage viewer disclosed in U.S. Pat. No. 3,361,031 of Stroud, issued on Jan. 2, 1968, and assigned to the assignee of this invention. In the microimage viewer disclosed in the Stroud patent, a matrix of microimages (sometimes referred to in the art as a "chip") is positioned on a table which is movable with respect to both X and Y axes (hereinafter referred to as an XY table and also known in the art as a "compound" table). The Stroud patent relates to an automatic retrieval system whereby any desired microimage may be immediately selected for magnification and projection. Although a single matrix, as used in the Stroud patent, may store approximately 10,000 images, there are obviously situations where it is desirable to store an increased number of images without increasing the size of the matrix.

Accordingly, the present invention relates to a device which permits the automatic selection of any one of a plurality of matrices of microimages, and including the provision of means for automatically loading the selected matrix on to the viewing table.

Figure 1:
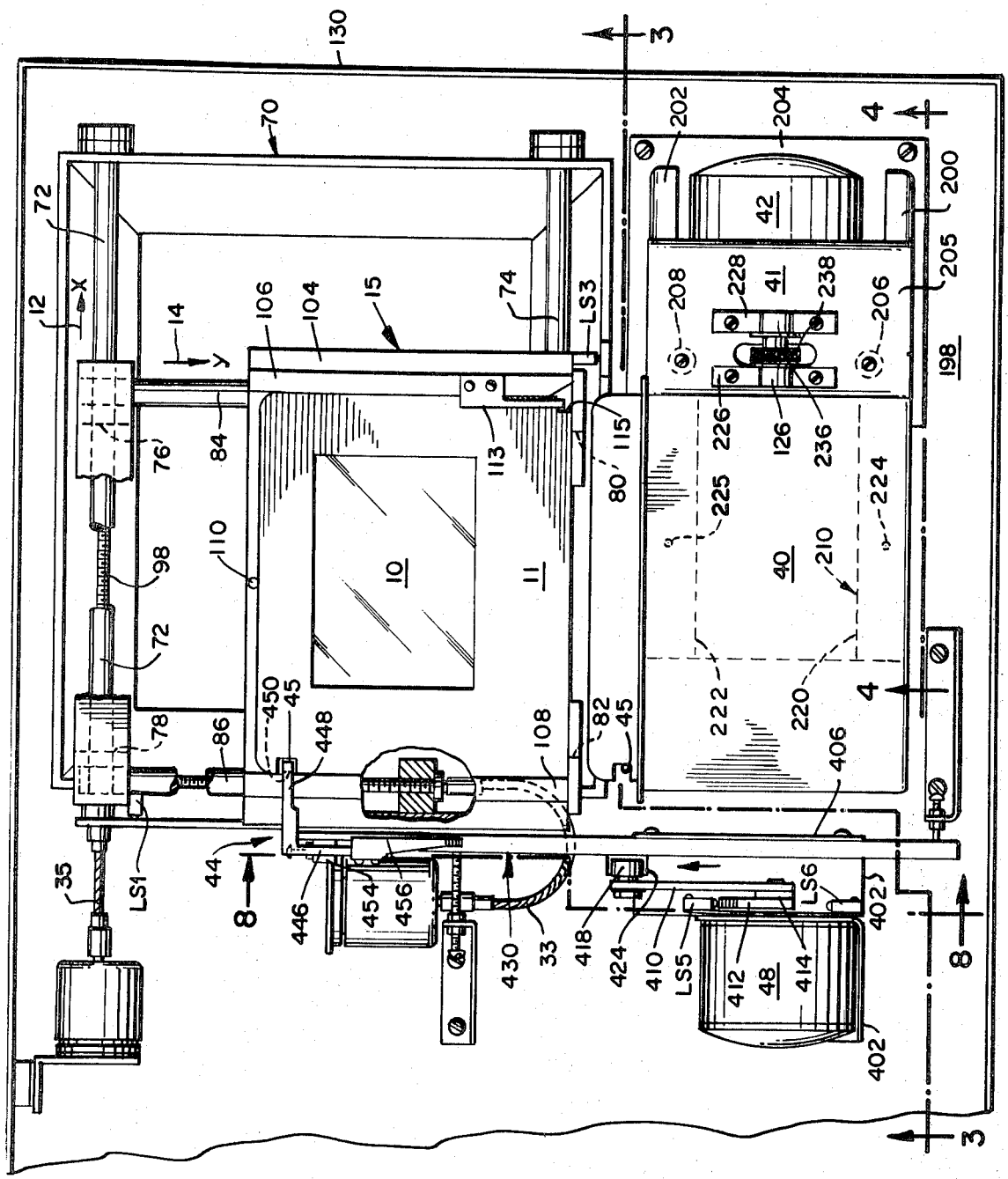
Figure 2:
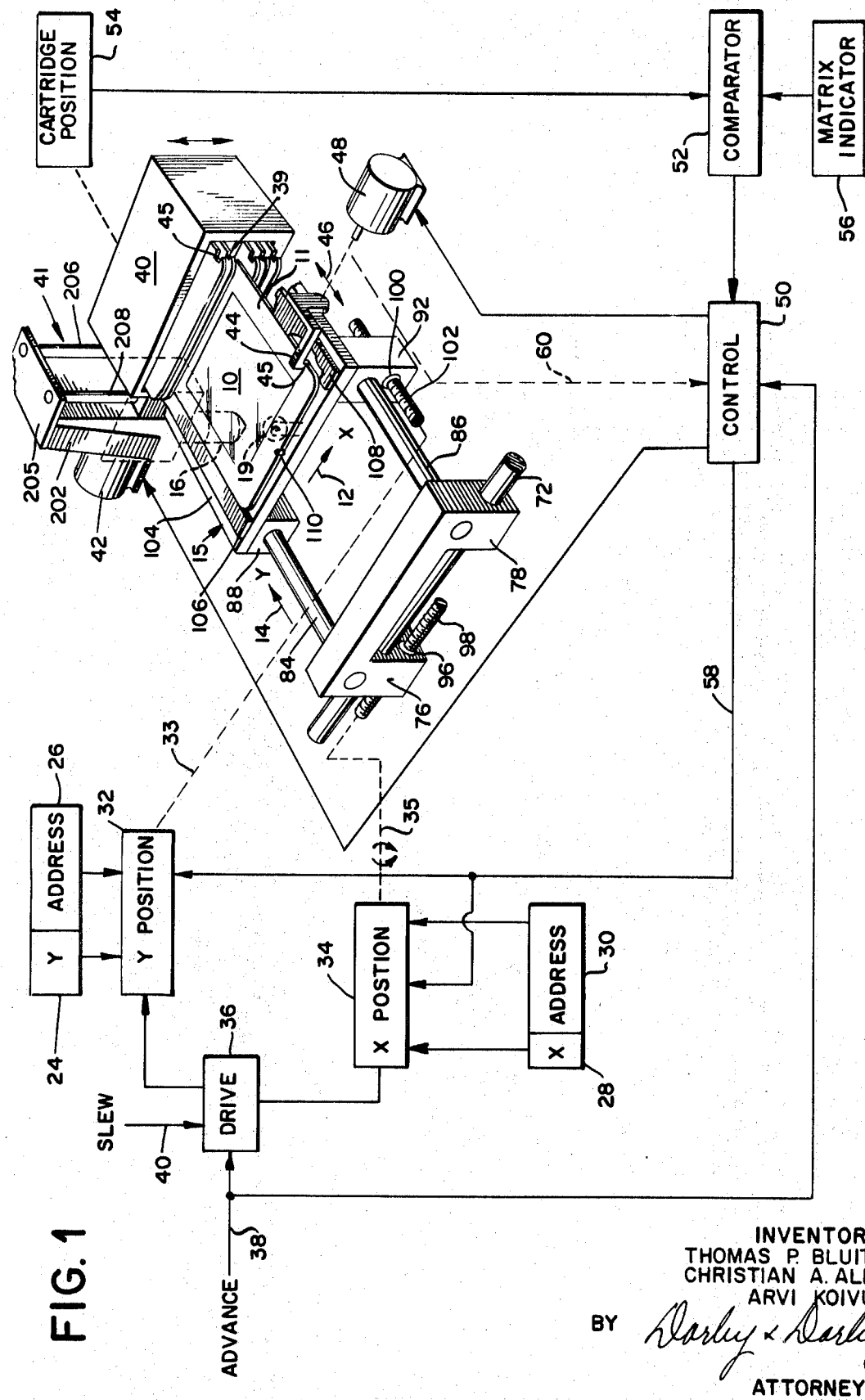
Figure 3:
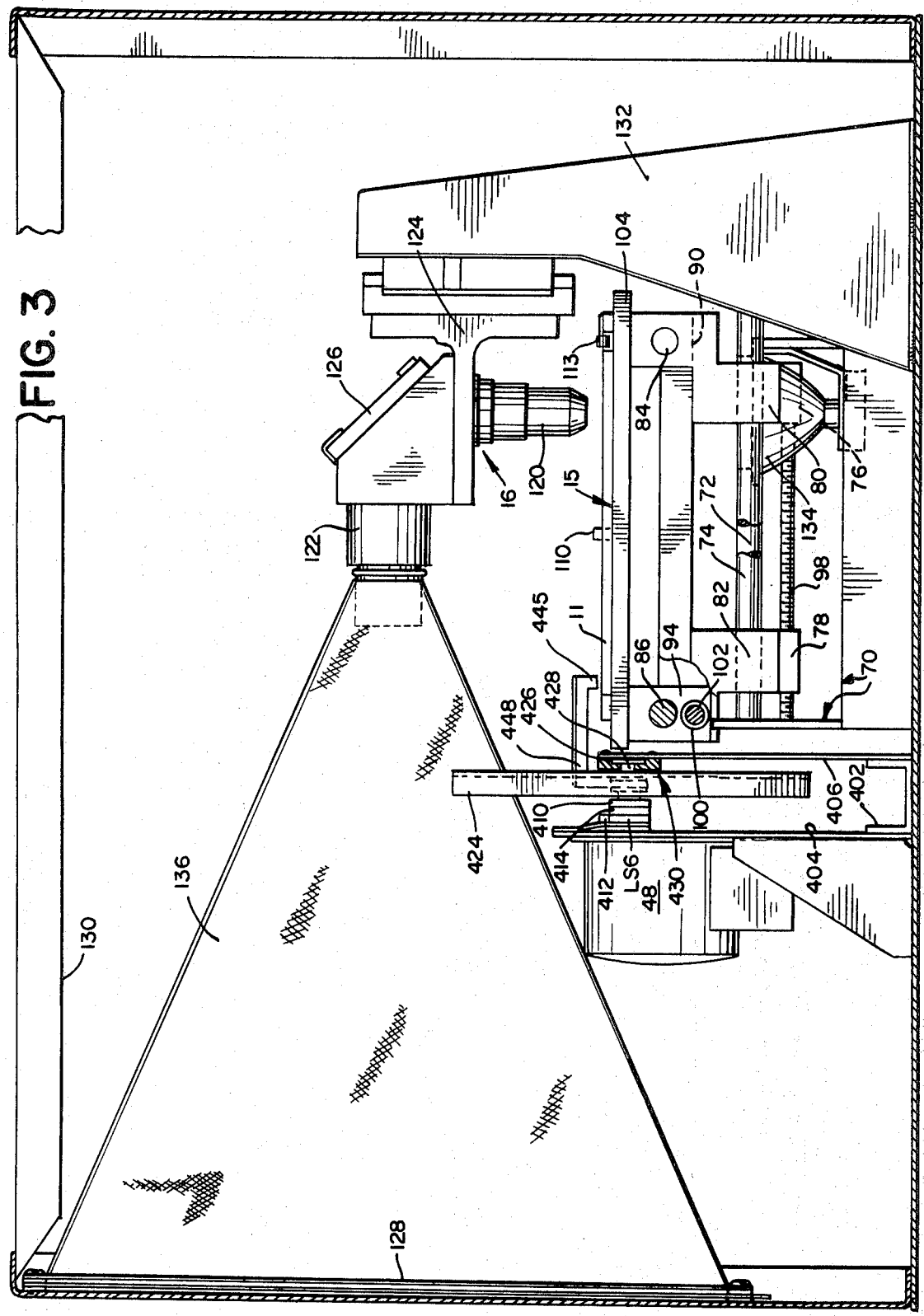
Figure 4:
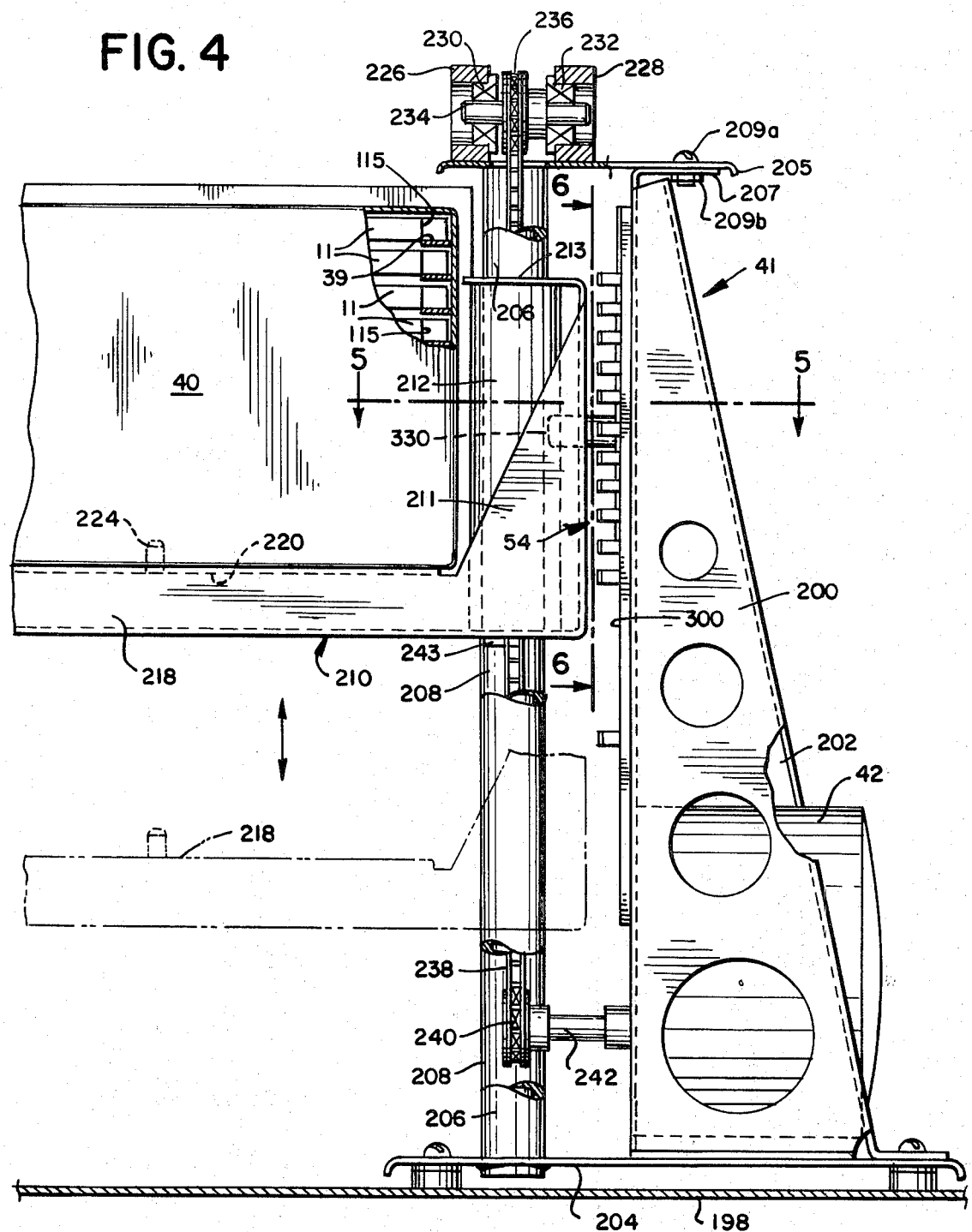
Figure 5:
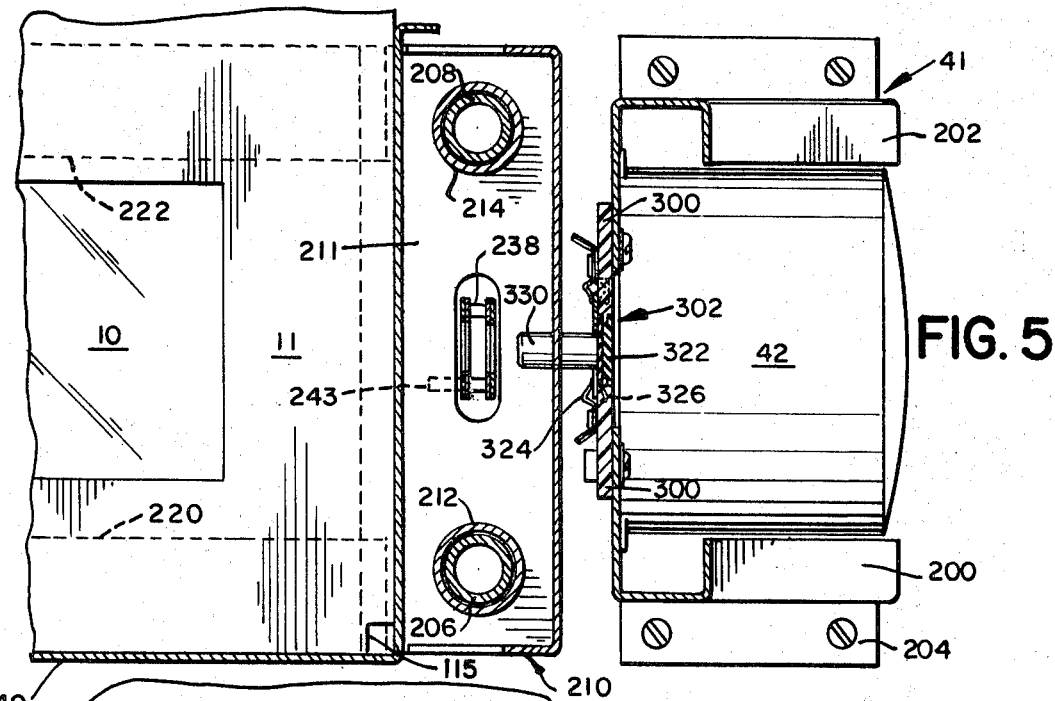
Figure 6:
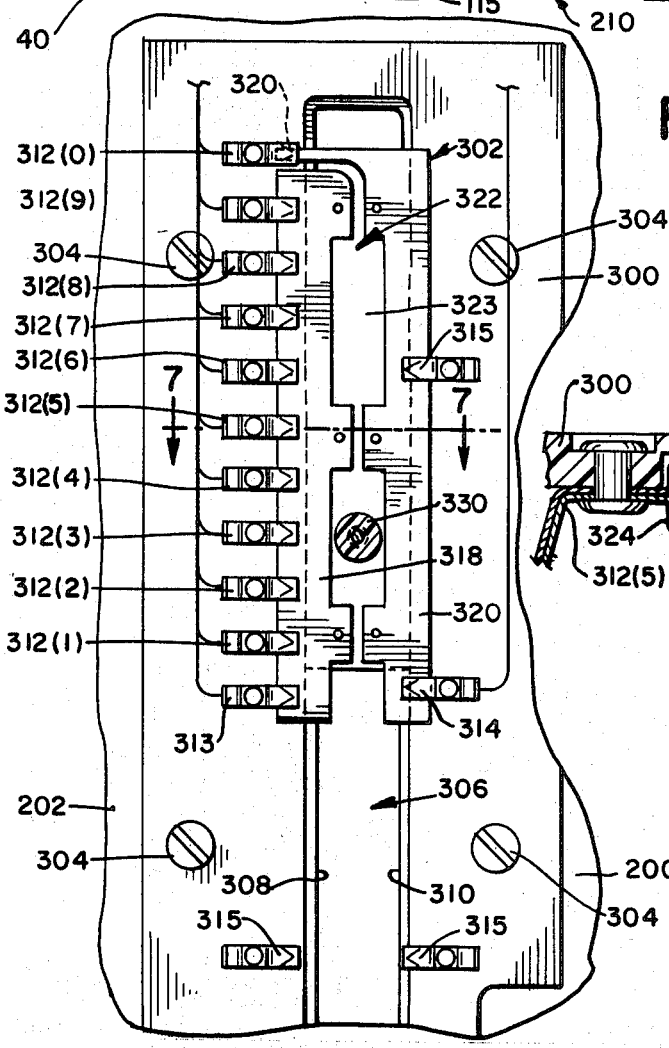
Figure 7:
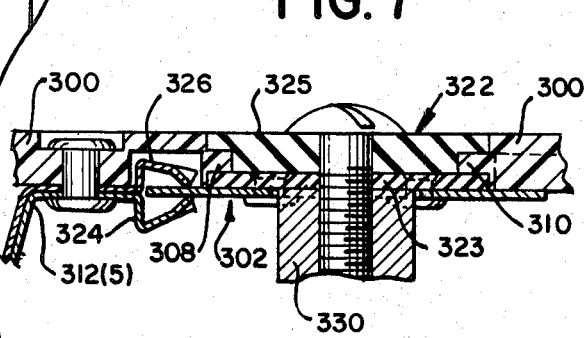
Figure 10C:
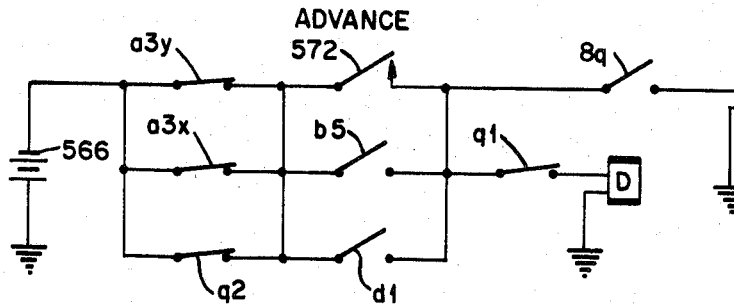
Figure 10A:
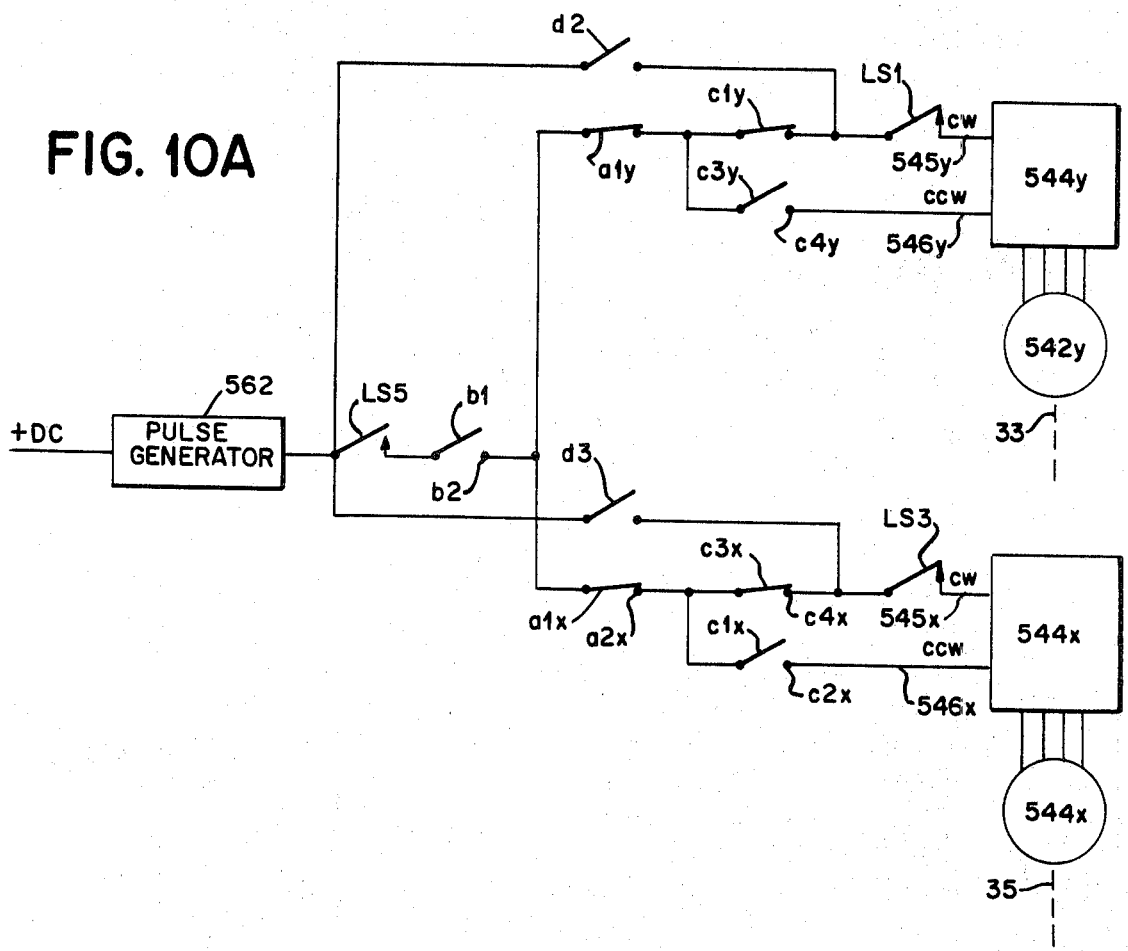
Figure 10B:
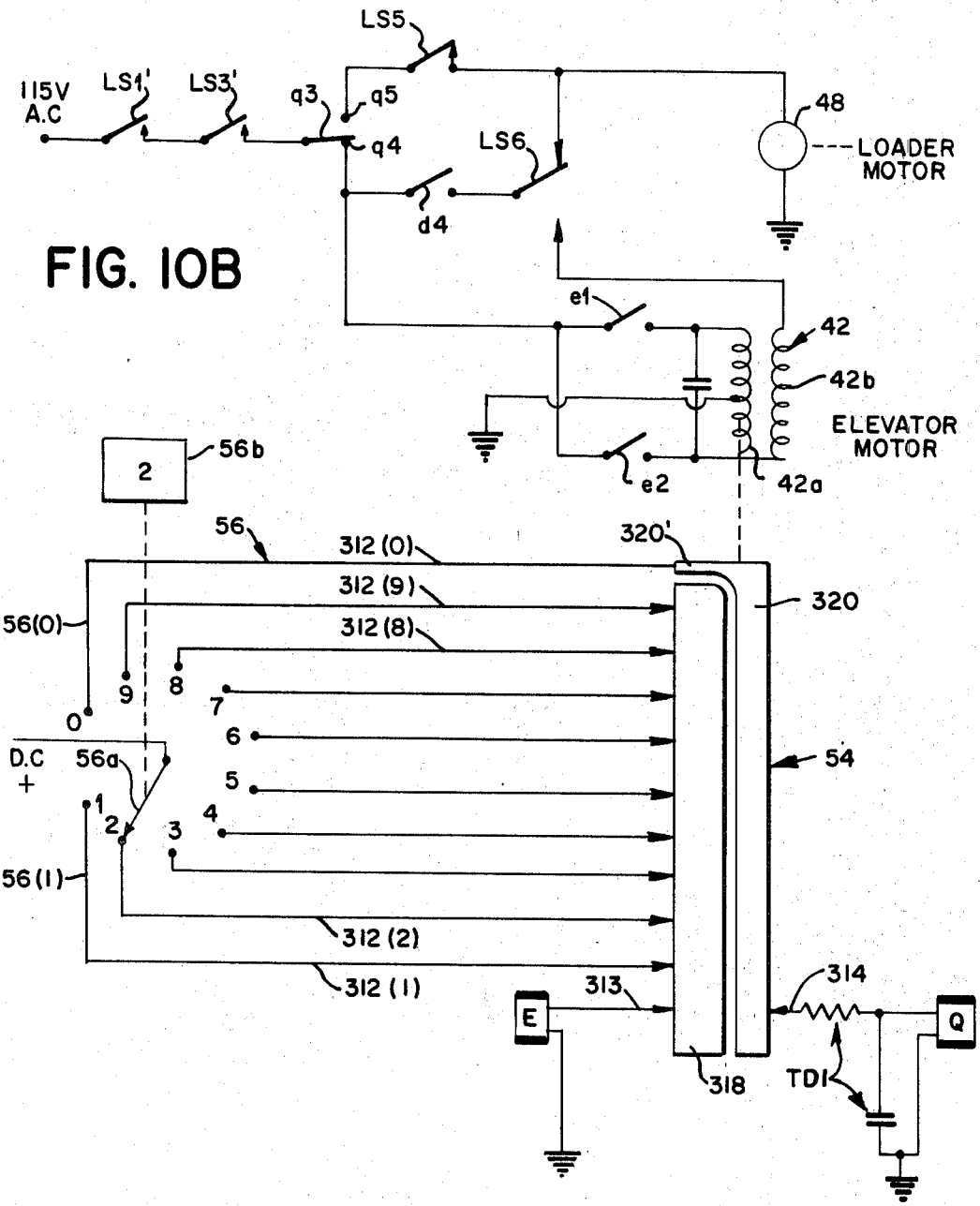

In the drawings:
FIG. 1 is a diagrammatic block diagram of the invention;
FIG. 2 is a top plan view (partially in section) of a microimage viewer according to the invention showing the arrangement of the elevator and loader assemblies;
FIG. 3 is a sectional view along the line 3—3 of FIG. 2;
FIG. 4 is a sectional view along the line 4—4 of FIG. 2 showing details of the elevator assembly;
FIG. 5 is a sectional view along the line 5—5 of FIG. 4;

FIG. 6 is an elevational view of the positioning switch assembly;
FIG. 7 is a detailed cross-sectional view along the line 7—7 of FIG. 6;
FIG. 8 is a front elevational view of the loader assembly;
FIG. 9 is a detailed cross-sectional view along the line 9—9 of FIG. 8;
FIGS. 10A, 10B and 10C comprise a circuit diagram, partially in schematic form, of the circuit used to control the movement of the various parts illustrated in FIGS. 2 through 9.

Briefly, in accordance with the invention, a plurality of microimage matrices are stored in a cartridge which is movable vertically with respect to the XY table of a microimage viewer. When it is desired to replace the first matrix on a table with a selected matrix, the number of the selected matrix is dialed into an indicator circuit which, when system operation is initiated, causes a loader assembly to retract the first matrix from its position on the table into its storage position within the cartridge. When the first matrix is in the cartridge, the control circuit automatically positions the cartridge vertically until the selected matrix is adjacent the surface of the XY table. At this point, the loader assembly withdraws the selected matrix from the cartridge and places it on the XY table where it is suitably registered. Thereafter, the circuit operation is returned to the existing X and Y positioning circuits which, for example, may be of the type disclosed in the aforementioned Stroud patent.

BLOCK DIAGRAM (FIG. 1)

The invention, in its preferred embodiment, is used in conjunction with the microimage viewer disclosed in U.S. Pat. No. 3,361,031 which issued on Jan. 2, 1968 to Stroud, and assigned to the assignee of this invention. Accordingly, to the extent required to explain the present invention, portions of the disclosure contained in the Stroud patent are included herein although such portions per se do not comprise a part of the present invention. Where feasible, the numerals used in FIG. 1 of the Stroud patent are used in FIG. 1 herein to identify the same elements.

As shown in FIG. 1 and in the Stroud patent, a typical two dimensional matrix of microimages 10 is shown supported in a frame 11. By way of example, matrix 10 may consist of 9801 (99×99) individual microimages each approximately .026 inch square. Matrix 10 may be considered to have transverse Y and X axes indicated by the arrows 12 and 14, respectively, and rests on a compound (or XY) table 15 which is movable with respect to both the X and Y axes.

An optical readout structure 16 (partially shown in dotted lines) is positioned over the matrix 10 and adapted to "read" the microimage immediately adjacent to it in the optical path. The located image is magnified and projected by the readout structure against a readout screen (not shown) situated, for example, on the front panel of the viewer. Most of the optical readout assembly is omitted from FIG. 1 solely for the purpose of avoiding undue complexity in the drawing. To the extent an understanding of this assembly is necessary to appreciate the invention, a description thereof is contained in the Stroud patent. Certain features of the optical readout structure are described below with reference to the mechanical construction of the preferred embodiment of the invention.

The coordinates of the individual images stored in matrix 10 are each identified by corresponding Y and X addresses. Since, in the present example, the matrix consists of 99×99 images, each image may be identified by two two-digit addresses corresponding to the respective axes. For this purpose, a pair of indicators 24 and 26 are provided to identify the desired image location along the Y axis, and a pair of corresponding indicators 28 and 30 to identify the X axis location. Indicators 24 and 28 correspond to the ten's position of the address and indicators 26 and 30 to the unit's position.

As shown schematically, indicators 24, 26 and 28, 30 are coupled to respective position control circuits 32 and 34. Position control circuits 32 and 34 include respective output shafts 33 and 35 which are rotatable in either clockwise or counter-clockwise directions depending upon signals applied to the corresponding position control circuit by a drive circuit 36 as explained below. Rotation of shafts 33 and 35 causes movement of matrix 10 along the Y and X axes, respectively, so that any desired image may be located immediately beneath the optical readout structure 16. Drive circuit 36 is rendered operative by an "ADVANCE" signal on line 38 and may be manually controlled or slewed by the presence of a signal on line 40 as explained in detail below.

In operation, the Y and X addresses (i.e., coordinates) of the image which it is desired to view are dialed into respective indicators 24, 26 and 28, 30. An "ADVANCE" signal is applied to line 38 causing drive circuit 36 to operate the Y and X position control circuits 32 and 34 rotating shafts 33 and 35 clockwise or counterclockwise. Simultaneously lamp 19 is energized to enable readout of the selected image. The rotation of shafts 33 and 35 positions matrix 10 along the Y and X axes 12 and 14 until such time as the address of the image in the optical path of the readout structure 16 coincides with the address dialed into the indicators 24, 26 and 28, 30. When coincidence along one axis occurs, the corresponding position control means is deenergized causing further rotation of its output shaft to cease. When both the Y and X addresses have been located, the matrix 10 remains stationary with the desired image in position for readout. As explained in detail below, the position control circuits 32 and 34 are able to reverse the rotation of their respective output shafts if required by the image search instruction.

The apparatus as so far described is fully explained in the Stroud patent and, as such, is representative of a prior art microimage viewer with which the invention is intended to be used.

According to the invention, a plurality of matrices such as 10 are stored in a vertically stacked relationship on shelves 39 extending around the interior wall of a cartridge 40 which is open so as to permit ready access to any of the stored matrices 10. As explained in detail below, cartridge 40 is mounted on an elevator assembly 41 so that it can be moved in a direction transverse to the plane defined by the illustrated X and Y axes, i.e., transverse to table 15. This vertical movement is caused by an elevator motor 42 which is suitably coupled to the cartridge 40 and positions the cartridge 40 so that a selected one of the stored matrices 10 is at a proper position with respect to the compound table 15 and can be slid from the cartridge 40 onto table 15.

The loading of the selected matrix 10 from the cartridge 40 onto the compound table 15 is caused by a selector lever 44 which moves back and forth in a horizontal plane as shown by the arrow 46 under the control of a loader motor 48. The lever 44 engages a notch 45 in the frame 11 supporting the selected matrix 10 so that the matrix can be moved from cartridge 40 onto table 15 and vice versa.

The operation of loader motor 48 and elevator motor 42 is controlled by a control circuit 50 which is responsive to the "ADVANCE" signal on line 38. Additionally, the control circuit 50 receives an input from a comparator 52 which compares the position of cartridge 40, derived from a circuit 54, with the address of the selected matrix inserted into an indicator 56 similar to the Y address indicator 24, 26 and the X address indicator 28, 30. In the preferred embodiment, only ten matrices are stored in the cartridge 40 so that indicator 56 may be a single digit indicator. The cartridge position circuit 54, as explained below, comprises a switch having movable contacts which are mechanically linked to the cartridge 40. The cartridge position circuit 54, in conjunction with the indicator 56, causes comparator 52 to produce an output when cartridge 40 has been positioned by elevator motor 42 so that the selected matrix 10 is in position to be moved onto the compound table.

The basic system operation of the invention as schematically shown in FIG. 1 is as follows. Under normal circumstances, a matrix 10 will be in position on the compound table 15 and it will be desired to replace it with the selected matrix, the address of which is dialed into indicator 56. When the user applies an "ADVANCE" signal to line 38, the control circuit 50 energizes the Y position circuit 32 and X position circuit 34 over line 58 causing the output shafts 33 and 35, respectively, to position the compound table 15 into a special loader position. When the table 15 is in the loader position, a pair of limit switches (not shown in FIG. 1) causes the control circuit 50 to actuate the loader motor 48 so as to withdraw the selector lever 44 (and the matrix 10 presently on the table) into its storage position within the cartridge 40.

When the chip 10 is withdrawn into cartridge 40, the elevator motor 42 is then actuated to move cartridge 40 up or down. As explained below, means are included to ensure that the motor 42 reverses its direction in case the cartridge 40 is initially moved in the wrong direction for the purpose of loading the selected matrix 10. The movement of the selector lever 44 actuates the elevator motor 42 through the control circuit 50 by means of limit switches (not shown) as represented by the dashed line 60.

When the selected matrix 10 has been vertically positioned so that it can be moved onto the table 15, the comparator 52 causes the control circuit 50 to stop the elevator motor 42. At the same time, the loader motor 48 is again energized to move the selector lever 44 outwardly from the cartridge 40. Since the selector lever 44 remains in the same horizontal plane at all times, it will necessarily engage the notch 45 of the selected matrix 10. As a result, the selected matrix 10 is moved outwardly from the cartridge 40 and onto the table 15 where it is suitably registered on the table by conventional means.

Control circuit 50 then causes the X and Y positioning circuits 34 and 32, respectively, to move the table 15 from the loading position, which automatically returns the system control to the X and Y addressing means so that the desired microimage on the selected matrix 10 can be located. At this junction, the system operates as described above and as explained in detail in the aforementioned Stroud patent.

Reference is now made to FIGS. 2–9, which illustrate the preferred construction of the XY table, and the elevator, cartridge position, and loader assemblies described with reference to FIG. 1.

THE XY TABLE

In the preferred embodiment, the XY table is essentially the same as the XY table described and claimed in U.S. patent application Ser. No. 613,175 of Alfsen and Bluitt, filed Feb. 1, 1967, and assigned to the assignee of this application. The table comprises a suitable base 70 in which a pair of lower horizontal guide rods 72 and 74 are suitably secured. A first pair of lower bearing blocks 76 and 78 ride on lower guide rod 72, and a second pair of lower bearing blocks 80 and 82 ride on the guide rod 74. Each of the bearing blocks 76, 78, 80 and 82 contains a standard Thomson linear bearing (not shown) as described in application No. 613,175.

A pair of upper guide rods 84 and 86 are inserted in opposing lower bearing blocks 76 and 80, and 78 and 82, respectively. Two additional upper bearing blocks 88 and 90 slide on guide rod 84, and a second pair of upper bearing blocks 92 and 94 slide on the upper guide rod 86.

The lower bearing block 76 is shaped to securely receive a lead nut 96 which is in threaded engagement with a lead screw 98 mechanically coupled directed to the X position output shaft 35. Similarly, the upper bearing block 92 contains a lead nut 100 in threaded engagement with a lead screw 102 which is mechanically coupled to the Y position output shaft 33.

A flat rectangular registration plate 104 is mounted on top of the upper bearing blocks 88, 90, 92 and 94, and includes stationary guide rails 106 and 108 for receiving a frame 11 and matrix 10 from the cartridge 40 (FIG. 1). A vertical stop pin 110 limits the movement of a selected matrix 10 within its frame 11 so as to provide accurate registration of the matrix on the plate 104. In the preferred embodiment, the plate 104 will be aligned with respect to the upper bearing blocks as described in the above-mentioned application Ser. No. 613,175. A spring 113 attached to guide rail 106 cooperates with a notch 115 in each frame 11 to continuously urge the frame 11 on plate 104 against the pin 110. Limit switches LS1 and LS3 are positioned for actuation by the moving table when plate 104 reaches the lower left-hand corner in FIG. 2, to provide an electrical indication that the table is in the loading position.

The optical readout assembly 16 also does not form a part of the present invention and may be conventional. For example, as shown in FIG. 3, it may comprise magnification and projection lens assemblies 120 and 122, respectively, supported on housing 124. A first surface mirror 126 reflects light from magnification lens 120 through projection lens 122 and onto a rear view projection screen 128 suitably on the front of a housing 130 in which the viewer is mounted. The optical readout assembly 16 is stationary with respect to the X and Y axes 12 and 14 (FIG. 1), but is mounted on a vertical bracket 132 in a conventional fashion to permit some vertical movement with respect to table 15 for focussing purposes. A lamp 134, directly beneath the magnification lens 120 provides the illumination required to project a selected image against screen 128. The optical path between projection lens 122 and screen 128 may be shrouded by a hood 136 to improve the image definition.

ELEVATOR ASSEMBLY

The elevator assembly is shown most clearly in FIGS. 4 and 5. It consists of two vertical support brackets 200 and 202 which are screwed or otherwise fastened to a plate 204 which, in turn, is fastened to the base plate 198 of the viewer. A top support ledge 205 is secured to upper horizontal flanges 207 of brackets 200 and 202 by screws and nuts 209a and 209b, respectively. Elevator motor 42 is supported on plate 204 between brackets 200 and 202. A pair of guide rails 206 and 208 are vertically supported between the bottom plate 204 top ledge 205 for the purpose of guiding the vertical movement of an elevator bracket 210.

Elevator bracket 210 includes a vertical mounting portion 211 which terminates in a top horizontal flange 213. A pair of vertical shaft housings 212 and 214, which slide on the guide rails 206 and 208, respectively, extend between the bottom of bracket 210 and flange 213. Standard nylon bearings (not shown) or the like may be used to reduce the friction between the guide rails 206, 208 and the shaft housings 212, 214.

The elevator bracket 210 also includes a horizontal mounting portion 218 which includes two ledges 220 and 222 on top of which the cartridge 40 rests. A pair of upstanding rivets 224 and 226 (see FIGS. 2 and 3) extend from the ledges 220 and 222, respectively, into mating engagement with suitable apertures in cartridge 40 (not numbered) for the purpose of accurately registering the position of the cartridge with respect to the elevator bracket 210.

A pair of opposing pillow blocks 226 and 228 are centrally mounted on the top ledge 205. Respective ball bearings 230 and 232 are suitably mounted in the pillow blocks 226 and 228, and a horizontal axle 234 is mounted for rotation in ball bearings 230 and 232. The axle 234 contains a central sprocket wheel 236 which engages a continuous chain 238, the lower extremity of which is in driving engagement with a sprocket 240 secured to the end of the output shaft 242 of the elevator motor 42. The elevator bracket 210 is supported on a pin 243 extending from a link in chain 238 so that rotation of the chain 238 in the proper direction will position the elevator bracket 210 between the extreme positions as indicated in the solid line and dotted line positions of FIG. 4.

CARTRIDGE POSITION ASSEMBLY

As mentioned previously, the cartridge position assembly 54 (FIG. 1) comprises a switch assembly. The mechanical structure of this switch is shown most clearly in FIGS. 5, 6 and 7, and is now described in detail. The electrical connections of the switch are described below with reference to FIGS. 10A and 10B.

The switch structure comprises stationary and movable contact assemblies 300 and 302, respectively. The stationary assembly 300 is attached to the elevator brackets 200 and 202 by suitable fasteners such as screws 304 (four illustrated). The stationary assembly 300 includes a central aperture 306 on the edges of which are formed inwardly facing tracks 308 and 310. The structure of the stationary assembly 300 as so far described is made of an insulating material such as phenolic resin.

Mounted on the stationary assembly 300 are ten terminals numbered 312(0) through 312(9), each of which corresponds to one of the matrices stored within cartridge 40. An eleventh stationary terminal 313 is mounted on member 300 immediately beneath 312(1) and serves to reverse the direction of movement of the elevator assembly as explained below. Opposite the ten terminals 312 and terminal 313 there is mounted a common terminal 314, the function of which is also described in detail below with reference to the circuit diagram of FIGS. 10A and 10B.

The movable contact assembly 302 consists of two conductive plates 318 and 320 shaped as shown in FIG. 6, with plate 320 including a tail portion 320' adapted to electrically connect terminal 314 to any one of the terminals 312(0)–312(9) and 313. The contact plates 318 and 320 are physically mounted in any suitable fashion to a slide member 322 which is made of an insulating material such as phenolin. For ease of manufacture, slide member 322 may consist of two insulating plates 323 and 325 suitably secured together (see FIG. 7). As shown most clearly in FIG. 7, each of the terminals 312, 313 and 314 consists of two jaws 324 and 326 which are spring-biased together and adapted to electrically contact the movable contact plate 318 (or 320) as the respective plate slides through the jaws. In addition to the terminals 312, 313 and 314, a plurality of guide members 315 shaped in the same way are provided to guide the movement of the movable contact assembly 302. Obviously, the guide members 315 are not electrically connected into the circuit.

The movable assembly 302 is mechanically connected to the elevator assembly by means of a pin 330 which is fastened to the insulating runner 322 and a suitable opening in the adjacent portion of the rear of the elevator bracket 210 (see FIGS. 4 and 5 also).

As shown in FIG. 6, the contact plate 320 of the movable assembly 302 contacts the terminal 312(0) and the common terminal 314. This corresponds to the uppermost position of cartridge 40. As the movable contact assembly 302 is moved in a downward direction with the elevator bracket 210, the contact plate 320 (via portion 320') will successively contact the stationary contacts 312(0) through 312(1). If the elevator assembly should initially move in a downward direction to locate a selected matrix, the contact 318 will close a circuit between terminal 314 and an energized terminal 312 which, as explained below, will cause the elevator assembly to move downwardly until the selected matrix has been olcated.

LOADER ASSEMBLY

The loader assembly is most clearly shown in FIGS. 2, 3, 8 and 9. It includes the loader motor 28 suitably mounted on a base mount assembly comprising a U-shaped channel 402 secured to the base of the viewer, and vertical plates 404 and 406 connected to opposite sides of the channel 402. The output shaft 408 of motor 48 is secured to a lever 410 which extends generally toward the XY table 15. As shown in FIG. 2, the loader assembly is generally opposite the elevator assembly with the cartridge 40 being positioned between the two.

Also coupled to the motor output shaft 408 is a cam 412 (the shape of which is shown in FIG. 8) and a rectangular spacer 414 which is placed between cam 412 and lever 410. The cam 412 is adapted to actuate one of two miniature, snap-action limit switches LS5 and LS6, as explained in further detail below.

A bell crank drive assembly is mounted on the end of lever 410 opposite the motor shaft 408, and comprises a ball bearing 418 secured by a bolt 420 which extends through an elongated aperture 422 (FIG. 7) within lever 410. The ball bearing 418 rides in a vertical U-shaped channel 424 which is secured to a horizontal elongated slide 426 by means of a short lug 428 (FIGS. 3 and 9). Slide 426 rides in a track assembly 430 which includes an internal T-shaped slot 432 (as shown best in FIG. 9) in which the slide 426 is slidably contained.

The selector lever 44 is mounted on the end of slide 426 furthest from motor 48, and includes a vertical mounting portion 442 which is fastened to the slide 426 outside of the track assembly by a screw 444. The remainder of the selector lever 44 comprises legs 446 and 448 lying in a horizontal plane and forming an L as shown in FIG. 2. At the free end of the leg 448 there is a short downwardly depending vertical lug 450 (FIG. 2) which passes behind the guide rail 106 into engagement with the notch 45 in one of the frames 11.

The outward movement of the selected matrix 10 is limited by abutment of the associated frame 11 against stop pin 110. The selector lever 44 is pivoted out of the notch 45 by a set-screw 452 extending through a block 454 which is formed on an extension of the track assembly 430. A leaf spring 456, connected to the vertical portion 442 of lever 44, is adapted to ride on the track assembly 430 to positively return the selector lever 44 into notch 45 when the matrix 10 is to be returned to the cartridge.

Operation of FIGS. 2–9

In FIGS. 2–9, the platform 104 is illustrated in the loader position, that is, in position to return the matrix 10 on the platform 104 to cartridge 40 for replacement with a second matrix. For purposes of the following discussion concerning the operation of the illustrated structure, it is assumed that the matrix 10 shown resting on platform 104 in FIG. 2 is to be returned to the cartridge 40 and replaced with another matrix 10. It is also assumed that the X and Y positioning circuits 34 and 32 have moved the platform 104 into its loader position in which the projection 450 of the selector lever 44 engages the notch 45 of the frame 11 resting on platform 104.

Since the number dialed into the matrix number indicator 56 (see FIG. 1) does not correspond with the cartridge position data from the circuit 54, the comparator 52 causes control 50 to operate the loader motor 48. The loader motor output shaft 408 starts to rotate in a clockwise direction (as viewed in FIG. 8) which causes lever 410 to also rotate, thereby causing the ball bearing 418 to exert a force on the vertical channel 424 to move it away from the platform 104. Since the channel 424 is secured to the slide 426 and the selector lever 44, the frame 11 on the platform 104, which is engaged by lever 44, is withdrawn into its proper position in the cartridge, the cartridge, of course, having remained stationary during use of the matrix.

When channel 424 reaches the dotted line position shown in FIG. 8, the matrix 10 formerly on platform 104 is fully within the cartridge 40. At the same time, the cam 412 actuates the plunger 460 of limit switch LS6 which initiates the next control signal from the control circuit 50 (FIG. 1).

The control circuit 50 then controls the elevator assembly through commands from the comparator 52. Assuming that it is desired to select a different matrix for viewing, the outputs of the cartridge position circuit 54 and the matrix indicator 56 will differ. Hence, the control circuit 50 causes the elevator motor 42 to rotate its output shaft 242 (FIG. 4) so that the elevator bracket 210 moves (for example) in a downward direction. As the elevator assembly moves downwardly from the topmost position illustrated in the drawings, the contact plate 320 (FIG. 6) will successively contact the terminals 312 via connector portion 320′. When a signal is applied to the terminal 312 corresponding to the selected matrix number dialed into indicator 56, comparator 52 will produce a signal causing the control 50 to stop the motor 42 and thus prevent further movement of the cartridge 40.

The selector lever 44 at this time will be in engagement with the notch 45 of the selected matrix 10, the notches 45 of the matrices 10 stored in cartridge 40 permitting the cartridge 40 to move even when the selector 44 is withdrawn to the dotted line position of FIG. 8. When the loader motor 48 is again actuated by the control 50, the motor output shaft 408 continues to rotate in a clockwise direction (as viewed in FIG. 8) which causes the ball bearing 418 to move the channel 424 and thus the selector lever 44 back to the solid line position of FIG. 8. Of course, when this occurs, the selected matrix 10 is pushed onto the platform 104 where it is properly registered by the guide rails 106 and 108 and the stop pin 110. When the matrix is properly positioned, the cam 512 actuates the plunger 462 of a second limit switch LS5 which, as described below, will transfer the control of the circuit to the X and Y position circuits 32 and 34 where the selected microimage is located in accordance with the teachings of the aforementioned Stroud patent.

THE CONTROL CIRCUIT

FIGS. 10A, 10B and 10C comprise a circuit diagram of a preferred embodiment control circuit 50, the cartridge position circuit 54, and the matrix indicator 56 represented in FIG. 1. (The above-described functions of comparator 52 are accomplished by the control circuit shown in FIG. 10B.) To the extent feasible, and for the purpose of facilitating an understanding of the invention, reference numerals used in FIGS. 1 to 9 are also employed in FIGS. 10A, 10B and 10C in describing the electrical functions of the previously described mechanical components. For purposes of explanation, certain portions of FIGS. 2A, B and C of the Stroud patent have been incorporated into this specification. Thus, the relays A, B and C and/or their associated contacts are the same as the correspondingly labelled relays and contacts in the Stroud patent. Any other "part" herein which is identified by a three-digit number, the first digit of which is a "5," is the same as the "part" in the Stroud patent which is identified by the identical last two digits. That is, motor control 544y herein is the same as motor control 44y of Stroud. As in Stroud, all relays are identified by a capital letter with the contacts of such relays being identified by the corresponding lower case letter and a subsequent numeral. All relay contacts are shown in their de-energized states. A lower case $x$ or $y$ adjacent a numeral means that the "part" identified by that numeral functions only as an element of the corresponding (i.e., X or Y) position control circuits and that there is a counterpart in the other position control circuit. FIGS. 10A and 10C are closely analogous to FIGS. 2A and 2C, respectively, of the Stroud patent, the differences being explained below. FIG. 2B of Stroud (or its equivalent) would be incorporated in the preferred embodiment of the present invention but is not contained in this specification since a full understanding of the XY selection process is not required for an understanding of the invention.

The X and Y position control circuits 30 and 32 include stepper motors 542x, y (FIG. 10A) operated by standard motor controllers 554x, y to rotate the respective output shafts 33 and 35 (see FIG. 1 also) so as to position table 15 along the X and Y axes. For example, when a pulse from pulse generator 562 appears on line 545y, shaft 33 rotates in a clockwise direction. When a pulse appears on line 546y, shaft 33 rotates in a counter-clockwise direction. An "ADVANCE" switch 572 (FIG. 10C) initiates the entire matrix searching sequence and also enables an "ADVANCE" relay B. Relay coils A ($x$ and $y$) and C ($x$ and $y$) are not illustrated since they relate to the XY selection apparatus, but certain of their contacts are shown in FIGS. 10A and 10C to complete the drawings.

In addition to the foregoing relays, the preferred embodiment of the invention incorporates a command relay Q (FIG. 10B), a loader positioning relay D (FIG. 10A) and an elevator reversing relay E (FIG. 10B). Various control signals are derived from limit switches LS1, LS1' and LS3, LS3' (which are actuated when table 15 is in the proper position to receive a matrix 10 from cartridge 40) and limit switches LS5 and LS6 (mechanically illustrated in FIG. 8). The legends LS1 and LS1' represent different pairs of contacts of the same limit switch as do the legends LS3 and LS3'.

The parts of cartridge position switch 54 are identified by the numerals used in FIG. 6. The matrix indicator 56 comprises a ten-position rotary switch including a common armature 56a (FIG. 10B) connected to a source of direct voltage and adapted to electrically contact one of ten stationary terminals 56(1)–56(0). Armature 56a is mechanically limited to an indicator 56b which provides a visual indication of the position in which armature 56a is manually placed. Each of the terminals 56(1)–56(0) is electrically connected to a respective cartridge position terminal 312(1)–312(0) so that, as explained below, command relay Q is energized when the position of movable contact member 320 (and thus cartridge 40) corresponds to the energized terminal 56(1)–56(0) contacted by armature 56a.

Motors 48 and 42 may be conventional reversible AC motors (although motor 48 need rotate in only one direction), only the stator coils 42a and 42b of motor 42 being illustrated herein. The coil 42b is a starting coil which provides the quadrature field required to start the motor.

CIRCUIT OPERATION

The operation of the circuit shown in FIGS. 10A, B and C is as follows. It is again assumed that matrix number "0" presently in position on the XY table 15 is to be replaced by matrix number "2." This means that the matrix indicator 56 will indicate a number (in the present example "2") which does not correspond with the number of the matrix presently on the table (i.e., "0"). As a result, the command relay Q is de-energized.

To initiate the chip loading process, the "ADVANCE" switch 572 (FIG. 10C) is depressed, applying direct voltage from battery 566 through relay contacts a3y and q1 to the loader position relay coil D. Energization of relay D completes a holding circuit through contacts q2, d1 and q1 to the coil D and also causes the pulse generator 562 (FIG. 10A) to apply pulses to the Y motor control 544y through contact d2 and the normally closed limit switch contact LS1. In the identical fashion the output of pulse generator 562 is coupled through the relay contact d3 and limit switch LS3 to the X motor control 544x. In both cases the pulses cause the respective motor controls to operate the Y and X motors 542y and 542x, respectively, such that the output shafts are rotated in a clockwise direcion so as to position the XY table 15 into a corner loading position.

When the table 15 reaches the loading position, the limit switches LS1 and LS3 are actuated, thereby opening the circuits to the motor control 542y and 542x and halting movement of table 15 in the desired loading position. Simultaneously, the limit switch contacts LS1' and LS3' (FIG. 10B) are closed to apply a 115 volt AC voltage to the loader motor 48 through relay contacts q3, q4 and d4 and limit switch LS6 (non-actuated). The loader motor then operates to cause the selector lever 44 to pull the matrix 10 on the table 15 back into the cartridge 40 as explained above.

When the matrix that was previously on table 15 is within the cartridge 40, the limit switch LS6 is actuated (see FIG. 8), transferring the AC voltage from the loader motor 48 to the stator coil 42b of elevator motor 48. In this example (the cartridge 40 at the "0" position, and the "2" position selected), terminal 312(2) will have a direct voltage applied thereto. This voltage is applied through terminal 312(2), movable contact 318, and terminal 313 to elevator reversing relay E which opens contact e1 and closed contact e2, causing the elevator motor 42 to run so that the elevator bracket 210 is lowered. (If matrix "2" were on the table and matrix "0" selected, relay E would remain de-energized, contact e2 open, and bracket 210 would move upwardly.)

When matrix number "2" is properly positioned for placement on the compound table, the command relay coil Q (FIG. 10B) is energized from the direct voltage on armature 56a through positioning switch terminals 312(2) and 314 which are electrically bridged by the contact 320. A relay is inserted by an RC circuit TD1 to compensate for the difference in speed of the elevator when moving upwardly or downwardly, thereby assuring that the contacts of the command relay Q close when the elevator is in the proper position for loading, regardless of the direction from which the selected matrix approaches the XY table 15.

After the elevator is suitably positioned, and command relay Q energized, the relay contact q3 transfers to terminal q5. Since the selector lever 44 is retracted, the limit switch LS6 remains actuated while the limit switch LS5 is in the non-actuated condition illustrated. Thus, command relay contacts q3 and q5 apply the 115 volt AC source to the loader motor 48 through the limit switch contacts LS1', LS3' and LS5. Accordingly, loader motor 48 causes the selector lever 44 to extract matrix "2" from the cartridge 40 and place it on the XY table 15 as previously described. When the matrix is properly positioned on the table 15, the limit switch LS5 (see FIG. 8) is actuated, opening the circuit to the loader motor 48 and simultaneously closing the circuit between pulse generator 562 (FIG. 10A) and the X and Y motor control circuits 544x and 544y.

The opening of the command relay contact q2 (FIG. 10C) will de-energize the relay coil D, which has a time release so that the d contacts remain actuated sufficiently long to load the selected matrix onto table 15. Furthermore, the closed contact q6 applies a DC voltage through contacts a3y (or a3x) and d1 to the "ADVANCE" relay B which closes contact b1 to couple the pulse generator 562 to the Y and X motor controls 544y and 544x, respectively. The relay contact b5 serves as a holding circuit for the relay B, permitting the X and Y motor control circuits 544x and 544y to drive the XY table 15 to the address represented on the X and Y address indicators 28, 30 and 24, 26. The operation in this respect may be identical to that described in the above-mentioned Stroud patent.

When the table 15 is suitably positioned with respect to the optical read-out structure, relays Ax and Ay (not shown) are energized (as explained in the Stroud patent) causing the relay contacts $a1y$ and $a1x$ (FIG. 10A) to open, thereby blocking application of the pulse generator pulses to the motor control circuits $544y$ and $544x$ to stop movement of the compound table. Opening of the contacts $a3y$ and $a3x$ (FIG. 10C) breaks the holding circuit to the relay coil B, thereby returning the circuit to its illustrated condition, i.e., with a matrix 10 on the XY table 15 suitably located for read-out of a selected microimage.

In the foregoing specification and the following claims, the term "microimage" includes all "microfilm" as that term is commonly used, and is not intended to imply any restrictions as to size or the format of the stored matrices. In fact, a "matrix" may actually consist of a single "microimage," such as a large flow diagram (mentioned in the Stroud patent) or any other image which is photographically stored on film. A "microimage viewer" is any device for reading such stored images. It is also obvious that the number of stored matrices may be varied in accordance with the invention. In the preferred embodiment illustrated herein, this number is merely dependent upon the number of stationary terminals employed in the positioning switch assembly.

What is claimed is:

1. In a microimage viewer for use with a matrix of microimages having X and Y axes coordinates defining a horizontal plane, wherein said matrix is supported in a frame adapted to rest on a table which is movable with respect to said X and Y axes so as to position a preselected microimage for magnification and projection by an optical read-out assembly, the improvement comprising:
    (a) a cartridge adapted to store a plurality of said matrices in a vertically stacked relationship, said cartridge including access means in at least one side for permitting a preselected one of said matrices to be moved between said table and its storage position within said cartridge,
    (b) an elevator assembly including means for moving said cartridge vertically with respect to said table so as to position a preselected matrix for movement between said table and cartridge,
    (c) means for producing a signal representative of the vertical position of said cartridge relative to said table,
    (d) matrix indicator means for producing a signal representative of a preselected matrix,
    (e) a loader assembly for moving a selected matrix from its position on said cartridge to a utilization position on said table, said selector assembly comprising a selector member adapted to engage a selected frame and advance means for moving said selector member between a first position in which said selected frame is within said cartridge and a second position in which said selected frame is on said table, and
    (f) control means, including:
        (i) means for actuating said drive means to move said selector member with said first matrix to said first position,
        (ii) means operable when said selector member is in said first position for actuating said cartridge moving means and de-energizing said drive means,
        (iii) means responsive to said signal producing means for stopping vertical movement of said cartridge and reactuating said drive means to move said selector member with said selected matrix to said second position.

2. A microimage viewer according to claim 1, wherein said elevator assembly includes means for supporting said cartridge and an elevator motor for moving said supporting means vertically with respect to said table.

3. A microimage viewer according to claim 1, wherein said signal producing means comprises a switch assembly, comprising:
    (i) a plurality of first terminals corresponding to respective ones of said matrices,
    (ii) a control terminal,
    (iii) a first contact for electrically contacting one of said first terminals and said control terminal, and
    (iv) means for moving said first terminals relative to said first contact so that the position of said first contact relative to said first terminals is proportional to the position of said cartridge relative to said table.

4. A microimage viewer according to claim 1, wherein said positioning switch assembly comprises:
    (i) a plurality of stationary terminals corresponding to respective ones of said matrices,
    (ii) a control terminal,
    (iii) a first movable contact shaped to make electrical contact between one of said stationary terminals and said control terminal,
    (iv) means connecting said movable contact to a movable portion of said elevator assembly so that the position of said movable contact relative to said stationary terminals is proportional to the position of said cartridge relative to said table.

5. A microimage viewer according to claim 4, wherein said matrix indicator means includes a matrix selection switch for applying a control signal to a selected one of said stationary terminals, said control signal being coupled through said movable contact to said control terminal when the matrix corresponding to said one stationary terminal is in position to be loaded onto said table.

6. A microimage viewer according to claim 4, wherein said positioning switch assembly further comprises:
    (v) a stationary elevator reversing terminal, and
    (vi) a second contact movable with said first movable contact and shaped to make electrical contact with at least one of said stationary terminals and said elevator reversing terminal, 7. A microimage viewer according to claim 6, wherein said matrix indicator means includes a matrix selection switch for applying a control signal to a selected one of said stationary terminals, said control signal being coupled through said movable contact to said control terminal when the matrix corresponding to said one stationary terminal is in position to be loaded onto said table.

8. A microimage viewer according to claim 7, wherein said loader assembly further comprises a motor rotatable in only one direction, and a bell crank assembly driven by said motor and adapted to drive said selector member.

9. A microimage viewer according to claim 1, wherein said control means further includes:
    (iv) means responsive to said matrix indicator means and said signal producing means for producing a control signal for positioning said table in a loader position adjacent said access means when it is desired to replace a first matrix on the table with a selected matrix.

10. A microimage viewer for use with a matrix of microimages having X and Y axes coordinates defining a horizontal plane, wherein said matrix is supported in a frame adapted to rest on a table which is movable with respect to said X and Y axes so as to position a preselected microimage for magnification and projection by an optical read-out assembly, the improvement comprising
    (a) a cartridge adapted to store N of said matrices in a vertically stacked relationship, said cartridge including access means in at least one side for permitting a preselected one of said matrices to be moved between said table and its storage position within said cartridge,
    (b) an elevator assembly including means for supporting said cartridge and an elevator motor for moving said supporting means vertically with respect to said table so as to position a preselected matrix for movement between said table and cartridge, (c) a positioning switch assembly for producing a signal indicative of the vertical position of said cartridge relative to said table, said switch assembly comprising N stationary terminals corresponding to respective ones of said N matrices, a stationary control terminal, a first movable contact shaped to make electrical contact between one of said N terminals and said control terminals, means connecting said first movable contact to a movable portion of said elevator assembly so that the position of said first movable contact relative to said stationary terminals is proportional to the position of said cartridge relative to said table, (d) a matrix selection switch for applying a control signal to a selected one of said N stationary terminals, (e) a selector assembly for moving a selected matrix from its position on said cartridge to a utilization position on said table, said selector assembly comprising (i) a selector member adapted to engage a selected frame, and (ii) loader means for moving said selector member between a first position in which said selected member is within said cartridge and a second position in which said frame is on said table, (f) control means, including (i) means for positioning said table in a loader position adjacent said access means when it is desired to replace a first matrix on the table with a selected matrix, (ii) means for actuating said loader means to move said selector member with said first matrix to said first position, (iii) means operable when said selector member is in said first position for actuating said elevator motor and de-energizing said loader means, (iv) means responsive to the making of an electrical contact between said control terminal and the stationary terminal corresponding to said first matrix for stopping vertical movement of said cartridge and reactuating said loader means to move said selector member with said selected matrix to said second position.

References Cited

UNITED STATES PATENTS

| | | | |
|---|---|---|---|
| 3,055,522 | 9/1962 | Cronquist | 353—25 X |
| 3,124,260 | 3/1964 | Tidball | 353—25 X |
| 3,361,031 | 1/1968 | Stroud | 353—27 |

SAMUEL S. MATTHEWS, Primary Examiner

U.S. Cl. X.R.

340—147